Patented Mar. 4, 1930

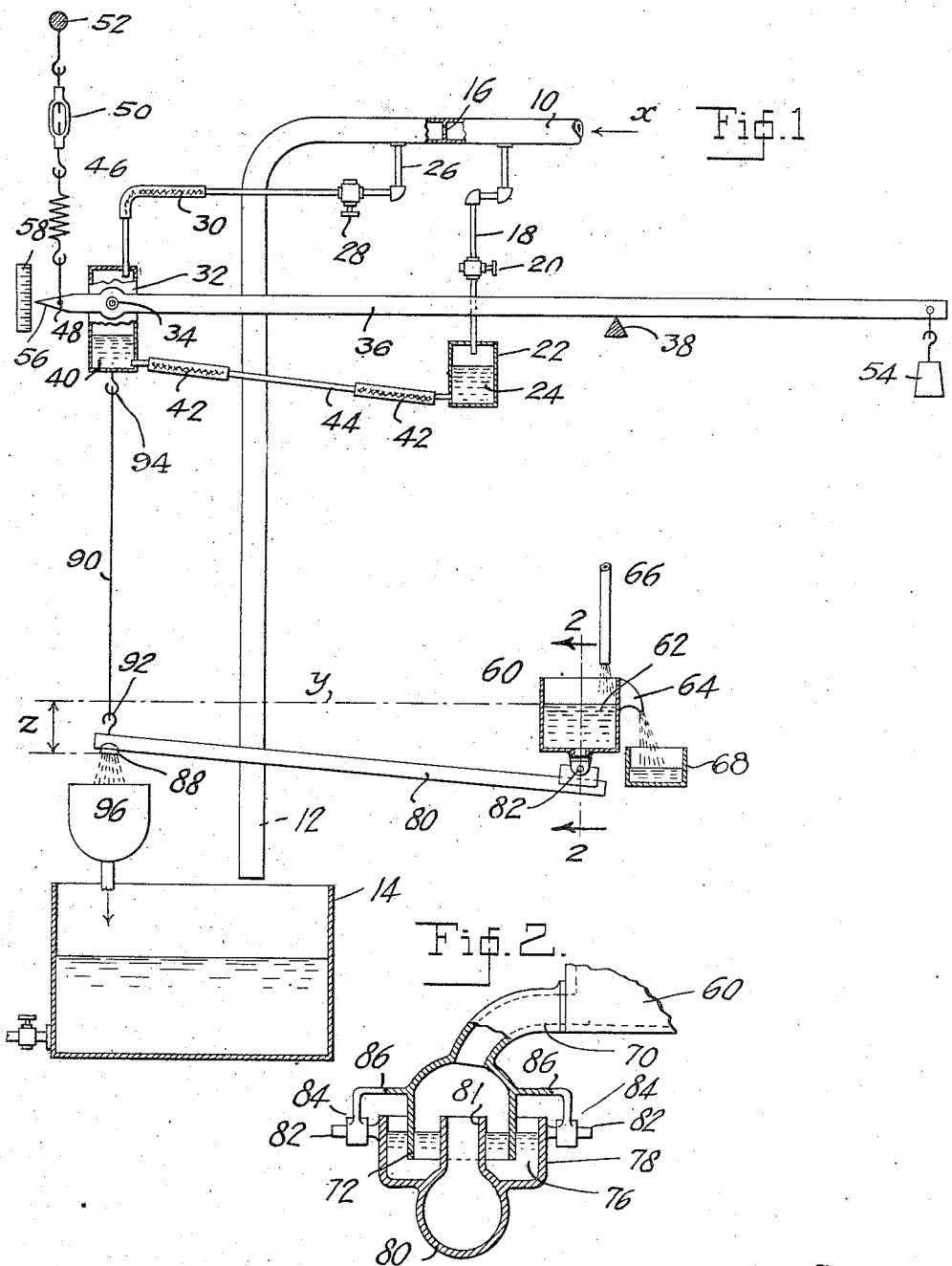

1,749,130

UNITED STATES PATENT OFFICE

PARLEY WESLEY CRAIG, OF ENSLEY, ALABAMA

APPARATUS FOR PROPORTIONING LIQUIDS

Application filed November 28, 1927. Serial No. 236,304.

The invention relates to apparatus for proportioning liquids. The embodiment of the invention illustrated while not limited thereto is particularly adapted for controlling the amount of a given chemical fed to a suitable receptacle which amount is automatically proportioned in accordance with the amount of water admitted to the receptacle and the arrangement is also designed to stop the flow of chemical when the flow of water to the tank ceases. The device preferably includes a member whose position is varied by and in accordance with pressure variations in different parts of water supply and said member is arranged to control the rate of flow from a chemical reservoir, the chemical reservoir and the water supply being adapted to automatically supply a mixture of the water and chemical to a suitable receptacle in predetermined proportions.

The invention will be fully apparent from the following specification when read in connection with the accompanying drawings and will be defined with particularity in the appended claims. In the drawings—

Fig. 1 is a somewhat diagrammatic view illustrating an embodiment of the invention;

Fig. 2 is a cross-section on line 2—2 illustrating the details of a liquid sealed trunnion.

Referring in detail to the drawings, 10 represents the inlet end of a feed water pipe, the end 12 of which is adapted to discharge water into a receptacle 14. At any point between the inlet end 10 and the discharge point 12, a restricted orifice or port 16 is provided. At one side of the port 16 a small branch pipe 18 having a valve 20 therein leads to a closed vessel 22 containing a body of mercury indicated at 24.

On the opposite side of the port 16 is a pipe 26 having a valve 28 therein. This pipe is connected by a flexible hose 30 with an enclosed vessel 32 pivotally supported on suitable trunnions 34 near one free end of a balance arm 36 which is fulcrumed on a knife edge 38. The vessel 32 is adapted to contain a body of mercury 40 and said vessel is connected by means of flexible connections 42 and pipe 44 with the fixed vessel 22.

A spring 46 is secured at one end 48 to the balance arm 36 and at its other end to an adjustable turn-buckle 50 secured to a fixed member 52. At its right end the balance arm 36 carries a counter-balance 54. The arm is provided with a pointer 56 which moves in juxtaposition to a suitably calibrated scale 58.

I provide a reservoir 60 containing a suitable chemical 62 which is to be mixed in definite predetermined ratio with the water supplied to the receptacle 14. This reservoir is provided with an overflow spout 64 and a constant level of liquid is maintained therein, the chemical being supplied by a suitable pipe 66 and the overflow being caught by a suitable tank 68. The chemical caught in tank 68 can be returned by a suitable pump to the reservoir 60. At its lower end, the reservoir 60 is provided with an outlet 70, the extremity 72 of which projects into a body of mercury 76 carried by an annular receptacle 78 formed at one end of a movable outlet conduit 80. This conduit includes an upwardly extending part 81 projecting above the level of the mercury 76. The arrangement is such that an effective liquid seal is provided and yet the member 80 can be moved relatively to the reservoir 60. The conduit 80 is provided with trunnion pins 82 which engage bearings 84 formed on suitable brackets 86 secured to the casing of the reservoir 60. The movable conduit 80 is provided at the end remote from the reservoir 60 with a suitable discharge port 88 and said movable conduit is also connected by means of a flexible member 90 with the balance arm 36, said member 90 engaging a hook 92 secured to member 80 at one end and a similar hook 94 secured to the receptacle 32 which latter is carried by the balance arm. The chemical discharged from the port 88 flows into the receptacle 14 through a suitable funnel 96.

In operation assuming the feed water is flowing in the direction of the arrow $x$, there will be a difference in pressure in the water supply duct on the different sides of the restricted orifice or port 16. When no water is flowing in the feed water pipe pressure on opposite sides of the port 16 is balanced and the arm 36 is held in equilibrium by spring and weight 46 and 54 and mercury vessel 32 and its contents. At such time, the outlet orifice 88 will be held at the same elevation as the liquid level of the chemical in the reservoir 60 as indicated by the horizontal line y. As soon as water is supplied to the pipe 10, a pressure difference will be set up on opposite sides of the port 16, pressure at the left side of the port in the arrangement illustrated being less than the pressure at the right side of the port. The increased pressure at the right side of the port 16 will force mercury from vessel 22 through flexible connections 42 and 44 into the vessel 32 carried by the balance arm. This will increase the weight at the left of the fulcrum 38 and thereby produce a turning moment proportional to the added weight. Thus, the movable conduit 80 will be lowered, for example, to the distance indicated in the drawings by z below the liquid level y. The distance z in hydrostatics is known as the head. The rate of flow from the orifice 88 is proportional to the head or in other words, the rate of flow is proportional to the vertical distance between the liquid level y and the outlet orifice 88 in the movable conduit. The greater the pressure on the right side of the restricted port 16, the greater will be the head. Conversely, the lower the pressure at the right side of the port 16, the smaller will be the head. It is apparent that if the pressure or velocity of flow in the pipe 10 is decreased, the excess of pressure in the mercury vessel 22 will be decreased thus permitting mercury from the vessel 32 to return to vessel 22. This will decrease the counter-clockwise turning moment of the balance arm 36, hence, the spring 46 and weight 54 will tend to move it clockwise, and because of the connection 90, the head z will be decreased and consequently the rate of discharge from the chemical reservoir will be accordingly decreased. The scale 58 is so calibrated that a definite predetermined movement of the balance arm is proportional to a definite variation in the quantity of chemical discharged from the reservoir.

A practical embodiment of this invention has been installed at a filter plant for boilers and test cards show remarkable close uniformity of water hardness. The apparatus is of extremely simple design and avoids complexities of known types of chemical feeding equipment heretofore used.

Various modifications and substitution of equivalents may be made without departing from the invention as defined in the appended claims.

I claim:—

1. Apparatus for automatically proportioning liquids including a duct for conveying one of the liquids, said duct having a restricted port, a member supported on an antifriction fulcrum, the movements of said member being responsive to pressure variations on opposite sides of said port, a liquid reservoir, an outlet conduit communicating with the lower portion of and movable relatively to said reservoir and means connecting said conduit and said member so that the elevation at which liquid is discharged from said outlet conduit is controlled by said member.

2. Apparatus for automatically proportioning liquids including a duct for conveying one of the liquids, said duct having a restricted port between the supply and outlet, a knife-edge having fulcrumed thereon a balance arm whose movements are responsive to pressure changes in said duct, a liquid reservoir, an outlet conduit communicating with the lower portion of and hinged to said reservoir and means connecting said balance arm and said movable conduit whereby the head under which liquid is discharged from said reservoir is varied in accordance with pressure variations in said duct.

3. Apparatus of the character described including a supply duct having a restricted port therein, a balance arm carrying a vessel adapted to contain mercury, a connection between said vessel and said duct on one side of said port, a second vessel adapted to contain mercury connected with said duct on the other side of said port, a flexible connection between said mercury vessels, a reservoir arranged to have a liquid of constant level therein, a movable outlet conduit for said reservoir and means for transmitting movement from the balance arm to the movable conduit so that pressure variations in said duct will vary the distance between level of liquid in the reservoir and point of discharge from said movable conduit.

4. Apparatus for automatically proportioning liquids including a duct for conveying one of the liquids, said duct having a restricted port between the supply and outlet, a balance arm whose movements are responsive to pressure changes in said duct, a liquid reservoir, a conduit hingedly connected to said reservoir, a receptacle secured to said conduit in juxtaposition to said hinge connection, said reservoir having an outlet duct whose lower extremity extends into said receptacle, said conduit having an upwardly extending part projecting above the lower extremity of said duct, said receptacle being adapted to hold a body of mercury forming a seal between the reservoir and the conduit.

In witness whereof, I have hereunto signed my name.

PARLEY WESLEY CRAIG.